(No Model.)

W. A. GRAY.
VALVE FOR PNEUMATIC TIRES.

No. 490,904. Patented Jan. 31, 1893.

Witnesses:
J. Staib
Chas H Smith

Inventor:
William A. Gray
per Lemuel W. Serrell
Atty

UNITED STATES PATENT OFFICE.

WILLIAM A. GRAY, OF ELIZABETH, NEW JERSEY, ASSIGNOR TO HIMSELF, AND EDWARD R. DE WOLFE, OF NEW YORK, N. Y.

VALVE FOR PNEUMATIC TIRES.

SPECIFICATION forming part of Letters Patent No. 490,904, dated January 31, 1893.

Application filed April 18, 1892. Serial No. 429,656. (No model.)

*To all whom it may concern:*

Be it known that I, WILLIAM A. GRAY, a citizen of the United States, residing at Elizabeth, in the county of Union and State of New Jersey, have invented a new and useful Improvement in Valves for Pneumatic Cycle-Tires, of which the following is a specification.

My invention is designed as an improvement upon the device shown and claimed in the patent granted to E. R. De Wolfe October 6, 1891, No. 460,714, the object of my invention being to simplify the construction and lessen the cost.

In carrying out my invention I combine with an inflatable or hollow expansible tube and a tubular cylindrical containing case, an elastic septum perforated for permitting the entrance of air and which closes automatically to prevent its escape, such septum being hollow and hemispheroidal seated and held in place within and between the parts of the cylindrical case.

Figure 1:
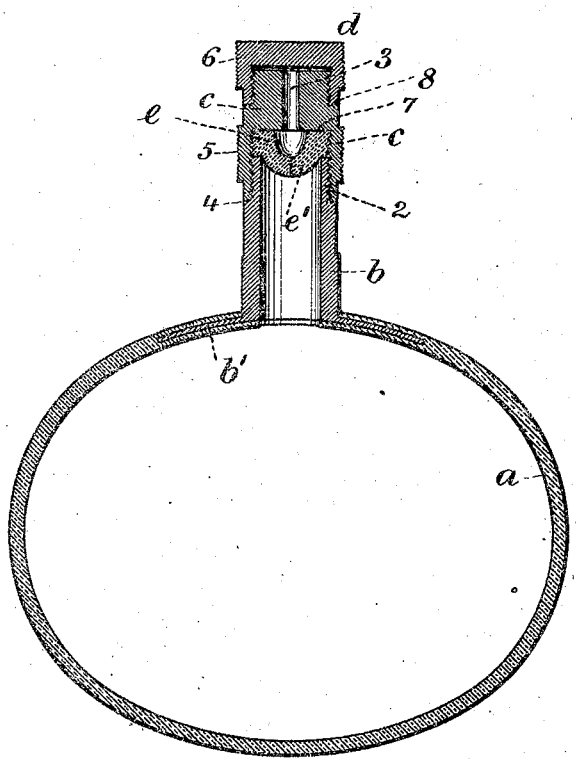
Figure 2:
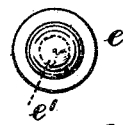

In the drawings Figure 1 represents a cross section of an inflatable or hollow expansible rubber tube and a cross section of my improved valve, and Fig. 2 represents by a plan view the elastic septum. These figures are of exaggerated size for clearness.

*a* represents the inflatable or hollow expansible tube of rubber. This is the inner air tub of the pneumatic tire, the other parts of the tire and the rim of the wheel not being shown in the drawings because they are of well-known form and do not require illustration or description.

*b* represents the tubular cylindrical case of metal having a disk *b'* or flanged base which is molded into the rubber composing the expansible tube *a*. The upper end of the cylindrical case *b* is slightly reduced and threaded at 2. *c* represents the cylindrical head perforated centrally at 3. The lower portion of this head is tubular and internally threaded and screws upon the cylindrical case *b*, the edges of the metal meeting and forming a tight joint at 4, and the periphery of this head *c* is knurled at 5 so that it may be readily turned by the fingers. The upper end of the cylindrical head is threaded and provided with a shoulder at 8 and an imperforate cap *d* screws upon the head down to a tight joint at the shoulder 8 completely shutting out water or dust from the valve. This cap is also knurled upon the outer surface at 6 so that it may be readily turned by the fingers. This cap *d* might be dispensed with or any equivalent device employed.

The elastic device for permitting the entrance of air but closing automatically to prevent its escape, consists of a septum of soft rubber having a base *e* and a perforated hollow hemispheroidal or dome-shaped center *e'* which are molded together as one piece. The base *e* fits within the cylindrical portion of the perforated head *c* and rests against the inner face of said head at 7, the other surface of the ring resting against the end of the tubular case *b*, and when the head *c* is screwed upon the case *b* the base *e* is clamped and slightly spread into the screw threads and held firmly in place, the hollow hemispheroidal center *e'* having its apex next to the hollow expansible tube *a*. The rubber is preferably perforated by thrusting a sharp pointed instrument through the hemispheroidal portion.

It will be readily understood that in order to inflate the tube *a* the cap *d* is removed and an air pump is either connected direct or by its coupling upon the cylindrical head *c*, and the air is forced through the perforation 3 of said head, expanding the hemispheroidal center and stretching the rubber and enlarging the perforation in the hemispheroidal center *e'* from within and opening its center sufficiently for the air to enter within the tube *a*. After the tube is sufficiently inflated and the pressure of the air pump removed, the rubber contracts and the pressure of air within the tube *a* effectually closes the perforation in the rubber hemispheroidal septum, preventing the escape of air, and the greater the pressure of air within the tube *a* the more tightly said hemispheroidal center is closed by compression as the pressure tends to flatten the dome but the boundaries of the rubber being limited the hemispheroidal center is flattened but little.

The construction of the parts is such that the walls of the hemispheroidal center taken together greatly exceed the opening through the base *e* and it is therefore impossible for the pressure to invert the parts or the confined air to escape. Air may be released from this hollow inflatable tube $a$ either by removing the cap $d$ and head $c$ or by inserting downwardly through the hemispheroidal center a fine tube which allows the tire to be deflated.

I do not herein claim the tubular cylindrical case or any part thereof.

I claim as my invention.

1. The combination with the tubular case $b$. and the perforated tubular head $c$ screwing upon the case $b$., of the hollow hemispheroidal perforated septum of rubber having a base $e$. held between the head $c$ and the end of the case $b$ substantially as set forth.

2. The combination with the inflatable or hollow expansible tube $a$, the tubular cylindrical case $b$ and its disk $b'$ molded into the tube $a$, of the perforated and tubular cylindrical head $c$ screwing upon the cylindrical case $b$, the soft rubber septum having a base $e$ and perforated hollow hemispheroidal center $e'$, the base $e$ being seated and held between the upper end of the cylindrical case $b$ and the inner surface of the cylindrical head $c$ with the apex of the hemispheroidal center toward the tube $a$, substantially as and for the purposes set forth.

Signed by me this 8th day of April, A. D. 1892.

WM. A. GRAY.

Witnesses:
　GEO. T. PINCKNEY,
　HAROLD SERRELL.